United States Patent [19]
Elliott

[11] 3,948,208
[45] Apr. 6, 1976

[54] ENGLISH/METRIC INDICATOR UNIT
[75] Inventor: Allen Elliott, Rexdale, Canada
[73] Assignees: Kenneth Ruddle; Clive Rathbone; Anthony Truslove, all of England
[22] Filed: Aug. 23, 1974
[21] Appl. No.: 500,055

[52] U.S. Cl................. 116/115.5; 116/DIG. 47
[51] Int. Cl.²......................................... B23Q 17/00
[58] Field of Search........... 116/115.5 EM, DIG. 47, 116/115.5; 33/126

[56] References Cited
UNITED STATES PATENTS

| | | | |
|---|---|---|---|
| 3,536,031 | 10/1970 | Sindall | 116/115.5 EM |
| 3,651,780 | 3/1972 | Medhurst | 33/126 |
| 3,714,924 | 2/1973 | Jankowski et al. | 116/115.5 EM |

FOREIGN PATENTS OR APPLICATIONS

| | | | |
|---|---|---|---|
| 1,372,687 | 11/1974 | United Kingdom | 116/DIG. 47 |

*Primary Examiner*—Richard C. Queisser
*Assistant Examiner*—Daniel M. Yasich
*Attorney, Agent, or Firm*—Holman & Stern

[57] ABSTRACT

A conversion unit for attachment to a machine tool constructed to operate normally in English units of measurement so that the machine tool may be used directly in metric units, or vice versa. The unit comprises an externally toothed gear wheel which may be fitted to a screw of the machine tool to turn with it, and an internally annular gear eccentrically mounted to mesh with the other gear, the number of teeth on the gears being chosen so that the correct conversion ratio is produced, the measurements being readable from graduated scales.

5 Claims, 3 Drawing Figures

ENGLISH/METRIC INDICATOR UNIT

BACKGROUND OF THE INVENTION.

This invention is concerned with an English/metric indicator unit which can be used to adapt a machine tool constructed normally to operate in English (i.c. inch) units of measurement, so as to permit its operation in metric units, or vice versa.

It will be appreciated that a conventional movement indicator device in a machine tool which is constructed normally to operate in, say, English units of measurement, is calibrated in inches. To enable the machine to be operated in metric units, each metric dimension (e.g. on a drawing) must first be converted by the operative into inches before he can operate the machine. For example, if to perform a particular operation on a lathe, the lead screw is required to move the tool carriage through 10mm, the operative must first convert this into 0.3937 in.; he can then turn the lead screw to effect this movement as shown on the lead screw indicator.

BRIEF SUMMARY OF THE INVENTION.

The object of the invention is to provide, for application to a lead or other rotary control member in a machine tool, an indicator unit which, in the case of a tool constructed to operate in English units of measurement, enables an operative to read directly in metric units, the amount of axial displacement produced by the member as it turns, or vice versa. It will be appreciated that this facility is becoming increasingly important at the present time as metric units of measurement become more and more widely used in engineering.

According to the invention there is provided, for a machine tool, an English/metric indicator unit comprising an externally-toothed gear wheel which can be fitted to a rotary control member (e.g. a screw) in a machine tool so as to turn with the member about its rotational axis; a rotatable internally-toothed annular member arranged in mesh said gear wheel with its axis of rotation eccentric to the axis of rotation of the latter, the number of teeth on the gear wheel and on the annular member being chosen to provide the appropriate English/metric conversion ratio between these two components; and a graduated scale on the annular member to indicate, with reference to a datum, the converted reading upon rotation of said rotary control member.

When fitted to the lead screw of a lathe, for example, rotation of the lead screw will turn said gear wheel to drive the annular member at a slower speed. Where the lathe is, say, constructed to normally operate in English units of measurement, the scale on the annular member will be graduated in metric units and the conversion ratio will be chosen so that the displacement of the tool carriage produced by turning the lead screw is automatically indicated in metric units on the said scale.

An operative can therefore operate the lathe directly in metric units.

GENERAL DESCRIPTION.

It will be realized from the foregoing that the indicator unit provided by the invention is of relatively simple construction for ease of manufacture and fitting to the machine tool in question, and for minimim cost. Moreover, this simplicity in construction enables the most convenient gear ratios to be chosen for maximum accuracy in conversion. For example, an English to metric gear ratio of 140:127 has been found particularly suitable, where the pitch of the lead screw of a machine tool is measured in multiples of ⅛ inch.

Also a range of sizes may be developed to cover machine tools from the smallest lathe to the largest milling machine.

Although the indicator unit provided by the invention may display only the converted reading, it is preferably arranged to display the reading in both metric and English units. The machine tool can then be operated in either set of units. To achieve this, the gear wheel of the unit may be arranged to drive a disc-form dial member which is marked around its periphery with graduations in the same units as those in which the machine tool is constructed for normal operation. This further member is conveniently positioned along-side the said annular member so that the reading is displayed side by side in both English and metric units. An indicator plate (see below) may be provided to mask the scale not being used at any time.

The construction of the indicator unit will be basically the same whether for use on a machine tool which normally operates in metric or English units. Such differences as there are will be in the gear ratio between the gear wheel and annular member and in dimensions.

BRIEF DESCRIPTION OF DRAWINGS

To facilitate understanding of the invention, and to enable it to be readily carried into practice, reference will now be made to the accompanying drawings which, illustrate an embodiment of a conversion indicator constructed in accordance with the invention. In the drawings:-

DETAILED DESCRIPTION

Figure 1:
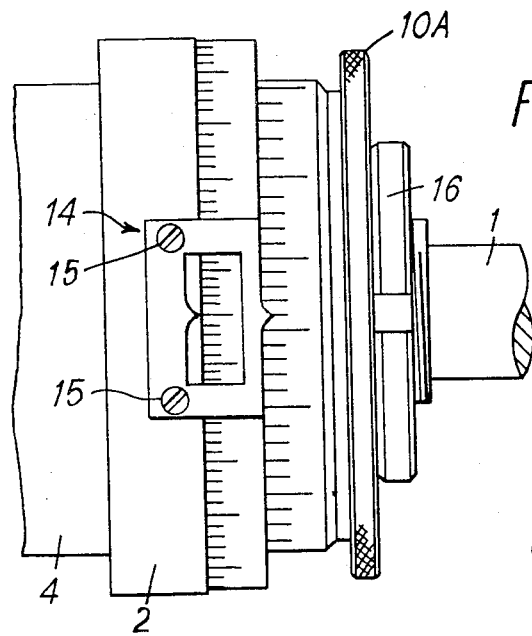
FIG. 1 is a elevational view of a conversion indicator unit constructed in accordance with the invention, for converting English measurements into their metric equivalent.

The drawings show an indicator unit for fitment, for example to the lead screw spindle 1 of a lathe. This particular indicator is used on a screw having English threads and is arranged to display in inches, the amount by which the tool carriage moves when the spindle is turned by an operative, and also to convert this measurement into a metric figure.

The unit itself comprises a circular base plate 2 which in use is mounted by bolts (not shown) on an appropriate part 4 of the machine tool through which the spindle 1 extends. An eccentric aperture 5 is formed in the base plate to receive a bush 6 mounted on spindle 1 and secured thereto by a setscrew (not shown). It will be noted that bush 6 has an enlarged outer end 6a.

The base plate 2 has a peripheral flange 7 which is used to locate (by engagement in a complementary rebate) a free internally-toothed ring gear 8. It will be appreciated that the central axis of gear 8 is therefore eccentric to the axis of spindle 1.

Arranged in mesh with gear 8 is an externally toothed pinion 9 which encircles bush 6. Pinion 9 has an integral flange 9a which is also integral with an annular dial member 10. The dial member 10 has a knurled peripheral rim 10a to facilitate turning thereof and is provided around its periphery with graduations in English units. The periphery of the ring gear 8, which is immediately adjacent member 10 is, on the other hand, marked around its periphery in metric measurements, these members being shaped and positioned so that their peripheries coincide at a viewing location.

The enlarged outer end 6a of bush 6 is formed with a ring 11 of serrations which normally mesh with complementary serrations 12 on the inside surface of the dial member 10. The dial member 10 is displaceable rightwards in FIG. 2 to disengage the respective serrations (for the purpose to be described) but the serrations are normally maintained in engagement by a spring 13 acting between the integral flange 9a on the dial member 10 and the enlarged end 6a of bush 6.

The principle of operation of the unit is that, as spindle 1 rotates in use, bush 6 turns at the same speed and drives the dial member 10 by way of the intermeshing serrations; the gear 8 is driven from member 10 by way of pinion 9. The ratio of the number of teeth on pinion 9 to those on gear 8 is chosen so that the number of graduations through which member 8 moves for a particular displacement of spindle 1 is the metric equivalent of the number of English graduations through which member 10 moves. In this embodiment, one division on the English scale represents 0.001 in., whilst one division on the metric scale represents 0.02mm. The ratio of the teeth on pinion 9 to those on gear 8 is, in this case 127:150, although other ratios would be required according to the pitch of the lead screw.

The intermeshing serrations on member 10 and bush 6 provide a facility for zeroing the gear 8 and the dial member 10 as is generally required when the unit is used on quick power traverse machine tools. Thus, to zero the dials, the dial member 10 is moved to the right in FIG. 2 against the action of spring 13 until the serrations on the member disengage from the serrations on bush 6. The dial member 10 is then turned to the appropriate position (usually the zero position) and released, whereupon spring 13 returns the components to the FIG. 2 position in which the serrations are again in mesh.

Of course, a similar effect could be achieved by providing alternative means for releasably locking the bush 6 to the dial member 10. In one example, a clutch means is provided in the form of a lever mounted on the bush 6 and movable radially to engage or disengage teeth on the lever with the serrations on the member 10. In another example, the clutch may comprise a slidably releasable ring gear adapted normally to mesh with the teeth of the bush 6 and the member 10.

Figure 3:
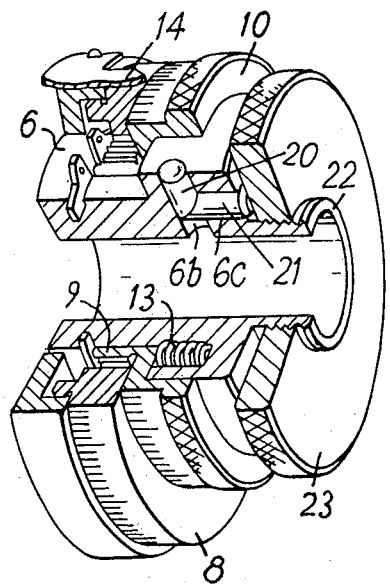
FIG. 3 is a fragementary perspective with parts broken away showing an alternative form of drive suitable for the unit of FIGS. 1 and 2.
Figure 2:
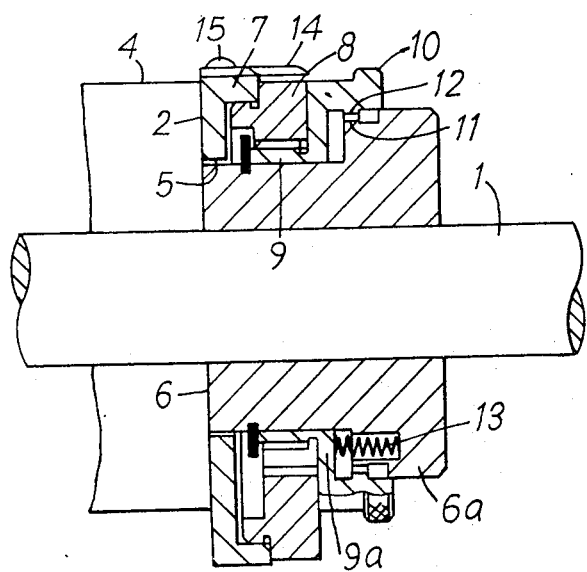
FIG. 2 is a diametral section of FIG. 1.

Mounted on the flange 7 of base plate 2 at the viewing location of the unit is an indicator 14 which is secured by screws 15. As can be seen from FIG. 1, the indicator is of rectangular shape and is formed with a pair of datum marks, one for each dial member. Alternatively, the indicator plate 14 could be slidably mounted for movement between two positions in each of which the scale on one of the dial members is masked, whilst the other is exposed to view.

Where the operation of the machine tool does not involve rapid traverse rates, it may be found preferable to replace a toothed clutch arrangement by a plunger drive as shown in FIG. 3, in which like reference numerals have been given to like parts of FIGS. 1 and 2. However, instead of the interengaging serrations 11 and 12, the confronting surfaces of the bush 6 and the dial member 10 are plain, but the bush 6 is provided with a radially extending bore 6b, communicating with an axially extending bore 6c. Two cylindrical plunger members 20 and 21 are received in bores 6b and 6c respectively and each member has one end surface machined at 45° so as to confront the correspondingly machined surface of the other member.

A threaded spigot 22 extending from the bush 6 receives a zeroing knob 23 which, when screwed in, bears against the outer end of the plunger 21, forcing the angled end thereof against the plunger 20 and thus urging it radially outwards to engage the plain surface of the dial member 10. Unscrewing the knob 23 will, of course, release the connection.

The form of the invention described above shows an indicator unit for converting English measurements to metric on machine tools constructed to normally operate in inches. It is to be understood that a unit constructed according to the invention for use on a machine tool which normally operates in metric measurements would be essentially similar. The differences would be that a gear ratio of, say, 100:127 might be used, ring gear 8 would carry English markings and the spacing and arrangement of the scale graduations would be appropriately amended. Thus, in such an instrument, one division on the metric scale may represent 0.02mm and one division on the English scale 0.001 in.

It will be understood that the choice of gear ratio, several examples of which have been mentioned above, depends both upon the lead screw of the machine tool, and upon the nature of the conversion required, metric/English or English/metric. A gear wheel commonly used in this type of tool is one having 127 teeth, and therefore it is convenient to choose the meshing gear so that the correct ratio with 127 is achieved. Conversion may be accurately achieved with for example a ratio of 150:127 where the screw lead is measured in multiplies of 1/10th inch, and a 140:127 will be preferred where the screw lead is measured in multiples of ⅛th inch.

We claim:

1. An English/metric indicator unit for a machine tool, consisting of two directly meshing toothed gear members, the first of which is an externally-toothed gear wheel fitted onto means secured a rotary control member of a machine tool so as to turn with the member about its rotational axis, a base plate secured to the machine tool and having an eccentric aperture, said first gear member bearing a first calibrated scale in one of English or metric units and rotatable concentrically about said rotational axis, and the second gear member of which is a rotatable internally-toothed annular member in mesh with first said gear member and received in said eccentric aperture with its axis of rotation eccentric to the axis of rotation of the first gear member, said second gear member bearing an integral second calibrated scale rotatable eccentrically about the rotational axis of the first gear member, the number of teeth on the first and on the second gear members being chosen to provide an appropriate one of an English/metric or metric/English conversion ratio between the two gear members, the second calibrated scale indicating with reference to a datum, a converted reading of the other of the English or metric units upon rotation of said rotary control member.

2. An indicating unit according to claim 1 in which said means comprises a bush to be mounted on the rotary control member of the machine tool which bush includes drive means optionally engageable with complementary portions on said dial member for driving engagement there between, an annular member displaceably mounted on the tool for disengaging the complementary portions the calibrated scales can be freely rotated relative to the control member.

3. An indicator unit according to claim 1, wherein one of said first and second gear members is provided with one hundred and twenty seven teeth.

4. An indicator unit according to claim 3, wherein the first gear member has one hundred and twenty seven teeth and the second member has 150 teeth to provide conversion from English units to metric units.

5. An indicator unit according to claim 3, wherein the first gear member has one hundred gear teeth and the second member has ond hundred and twenty seven teeth to provide conversion from metric units to English units.

* * * * *